(12) United States Patent
Park et al.

(10) Patent No.: US 10,056,658 B2
(45) Date of Patent: Aug. 21, 2018

(54) BATTERY PACK

(71) Applicant: SAMSUNG SDI CO., LTD., Yongin-si, Gyeonggi-do (KR)

(72) Inventors: Juyong Park, Yongin-si (KR); Seungwoo Yang, Yongin-si (KR); Hyun Kim, Yongin-si (KR); Jaelim Ryu, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 50 days.

(21) Appl. No.: 15/060,646

(22) Filed: Mar. 4, 2016

(65) Prior Publication Data

US 2016/0268657 A1   Sep. 15, 2016

(30) Foreign Application Priority Data

Mar. 12, 2015  (KR) .................. 10-2015-0034520

(51) Int. Cl.
| | |
|---|---|
| *H01M 10/6568* | (2014.01) |
| *H01M 10/6556* | (2014.01) |
| *H01M 2/10* | (2006.01) |
| *H01M 10/6567* | (2014.01) |
| *H01M 10/613* | (2014.01) |
| *H01M 10/6554* | (2014.01) |
| *H01M 10/625* | (2014.01) |

(52) U.S. Cl.
CPC ..... *H01M 10/6556* (2015.04); *H01M 2/1077* (2013.01); *H01M 10/613* (2015.04); *H01M 10/6554* (2015.04); *H01M 10/6567* (2015.04); *H01M 10/6568* (2015.04); *H01M 10/625* (2015.04)

(58) Field of Classification Search
CPC ........... H01M 10/6556; H01M 10/613; H01M 10/6554; H01M 10/6568
USPC ........................................... 429/120
See application file for complete search history.

(56) References Cited

U.S. PATENT DOCUMENTS

| | | |
|---|---|---|
| 2009/0325055 A1 | 12/2009 | Koetting et al. |
| 2012/0301769 A1 | 11/2012 | Okada et al. |
| 2013/0183555 A1 | 7/2013 | Boddakayala |
| 2014/0162107 A1 | 6/2014 | Obrist et al. |

FOREIGN PATENT DOCUMENTS

| | | |
|---|---|---|
| DE | 10 2010 013 025 A1 | 9/2011 |
| JP | 10-177861 A | 6/1998 |
| JP | 2013-229182 A | 11/2013 |

(Continued)

OTHER PUBLICATIONS

Examination Report issued by the European Patent Office dated Apr. 20, 2017 in the examination of the European Patent Application No. 16 159 227.4.

(Continued)

*Primary Examiner* — Jonathan G Leong
(74) *Attorney, Agent, or Firm* — Lee & Morse, P.C.

(57) ABSTRACT

A battery pack including a housing; at least one battery module arranged in the housing; and a cooling plate coupled to the housing and cooling the at least one battery module, wherein the cooling plate includes a first cooling plate that contacts the at least one battery module; a second cooling plate coupled to the first cooling plate, the second cooling plate including a flow path therein; and a container on the second cooling plate, the container having an inner space that is connected to the flow path.

8 Claims, 4 Drawing Sheets

(56) References Cited

FOREIGN PATENT DOCUMENTS

| KR | 10-2008-0045789 A | 5/2008 |
|----|-------------------|--------|
| KR | 10-2010-0047101 A | 5/2010 |
| KR | 10-2011-0128464 A | 11/2011 |
| KR | 10-2012-0132382 A | 12/2012 |

OTHER PUBLICATIONS

Extended European Search Report dated Jul. 15, 2016 in Corresponding European Patent Application No. 16159227.4.

BATTERY PACK

CROSS-REFERENCE TO RELATED APPLICATION

Korean Patent Application No. 10-2015-0034520, filed on Mar. 12, 2015, in the Korean Intellectual Property Office, and entitled: "Battery Pack," is incorporated by reference herein in its entirety.

BACKGROUND

1. Field

Embodiments relate to a battery pack.

2. Description of the Related Art

A battery pack may be a device including at least one battery module. Such battery pack may be used in various apparatuses, e.g., electric cars, hybrid cars, or electric bicycles, and may supply electricity.

The battery module arranged inside the battery pack may be a rechargeable secondary battery. For example, the battery module may convert chemical energy to electric energy via a chemical reaction.

SUMMARY

Embodiments are directed to a battery pack.

The embodiments may be realized by providing a battery pack including a housing; at least one battery module arranged in the housing; and a cooling plate coupled to the housing and cooling the at least one battery module, wherein the cooling plate includes a first cooling plate that contacts the at least one battery module; a second cooling plate coupled to the first cooling plate, the second cooling plate including a flow path therein; and a container on the second cooling plate, the container having an inner space that is connected to the flow path.

A surface of the first cooling plate may be uneven.

The at least one battery module may be mounted on a protruding portion of the first cooling plate.

The second cooling plate may include a projection that protrudes toward the first cooling plate.

The projection may be uneven.

The at least one battery module may include a plurality of battery modules, and a direction of the flow path and a direction in which the plurality of battery modules may be arranged to form an angle or are parallel to each other.

The cooling plate may further include a buffer that is connected to the flow path of the second cooling plate, the buffer having a space to temporarily store coolant.

The inner space of the container may have a stair-step structure.

An area of the inner space of the container into which a coolant flows from an inlet may be larger than other areas of the inner space of the container.

The container may supply coolant from an outside of the battery pack to the flow path, the container changing a direction of the coolant supplied from the outside of the battery pack to the flow path.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
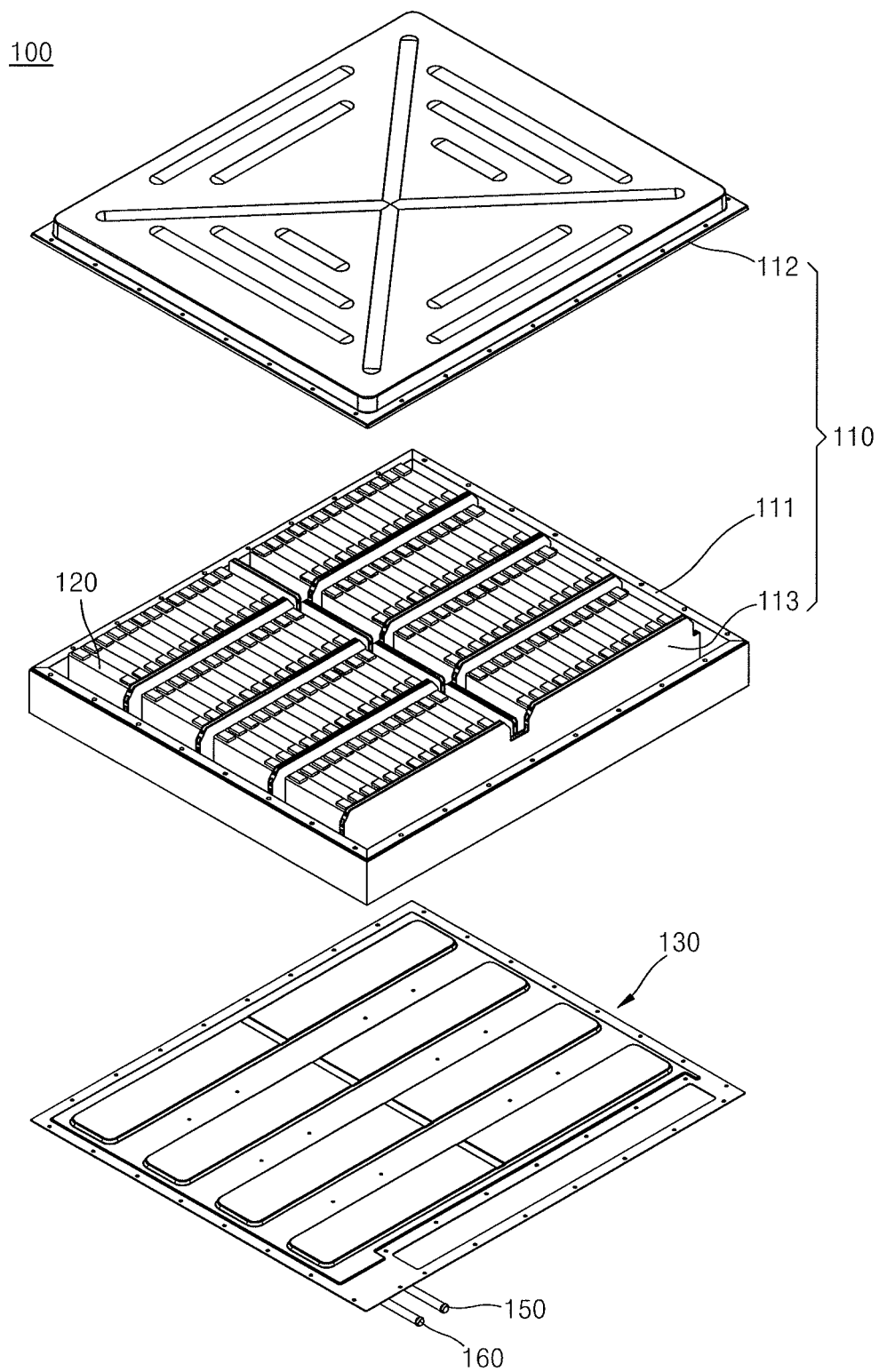
FIG. 1 illustrates an exploded perspective view of a battery pack according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

An expression used in the singular encompasses the expression of the plural, unless it has a clearly different meaning in the context. In the present specification, it is to be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added. It will be understood that although the terms "first," "second," etc. may be used herein to describe various components, these components should not be limited by these terms. These components are only used to distinguish one component from another. Expressions such as "at least one of," when preceding a list of elements, modify the entire list of elements and do not modify the individual elements of the list.

Figure 2:
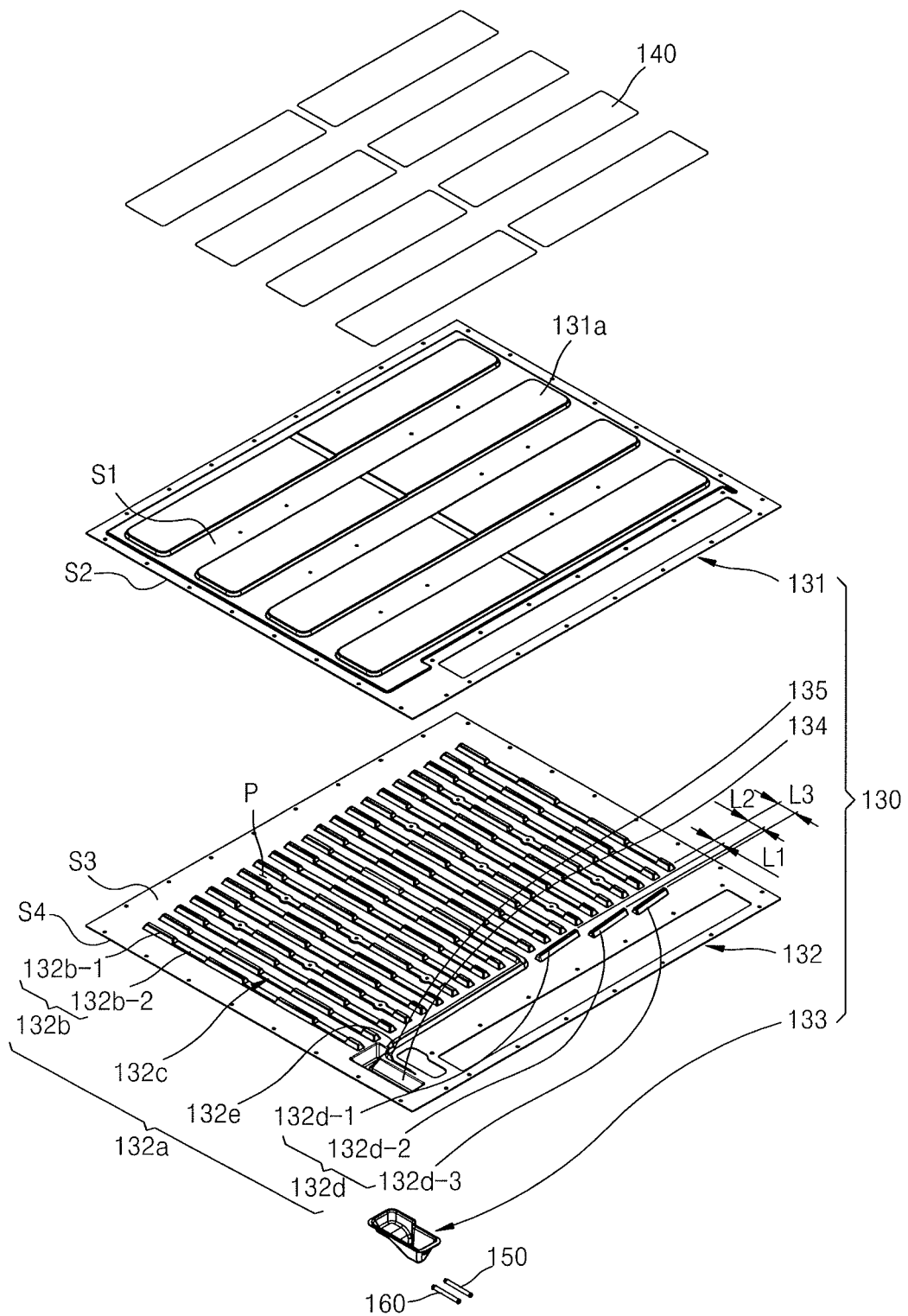
FIG. 2 illustrates an exploded perspective view of a cooling plate shown in FIG. 1.
Figure 3:
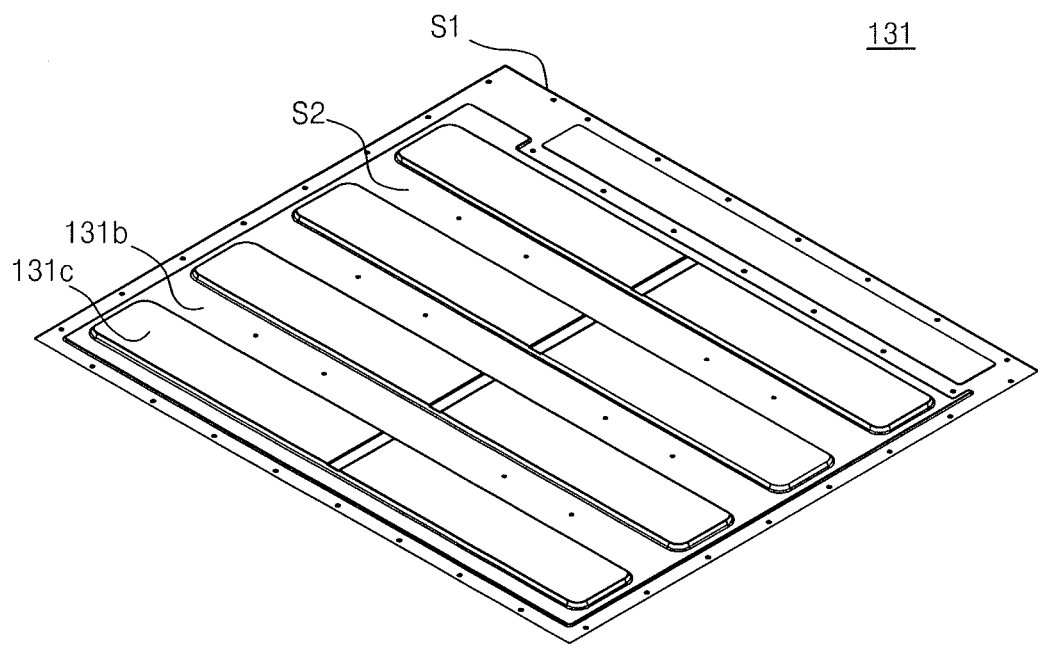
FIG. 3 illustrates a perspective view of a back side of a first cooling plate shown in FIG. 2.
Figure 4:
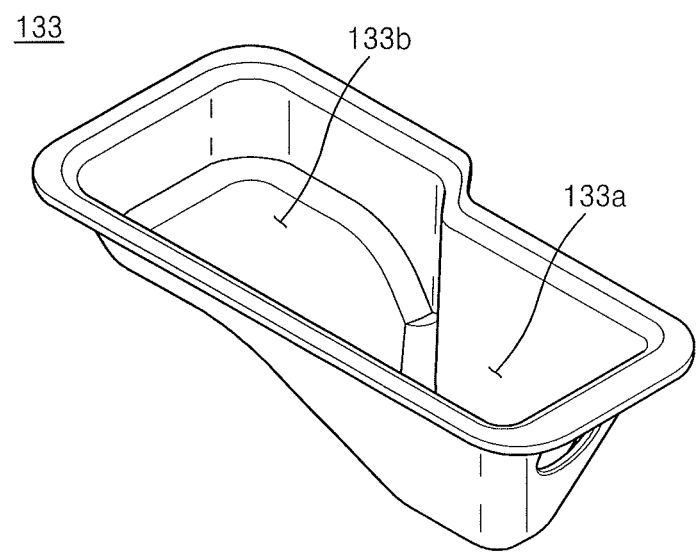
FIG. 4 illustrates a perspective view of a container shown in FIG. 2.
Figure 5:
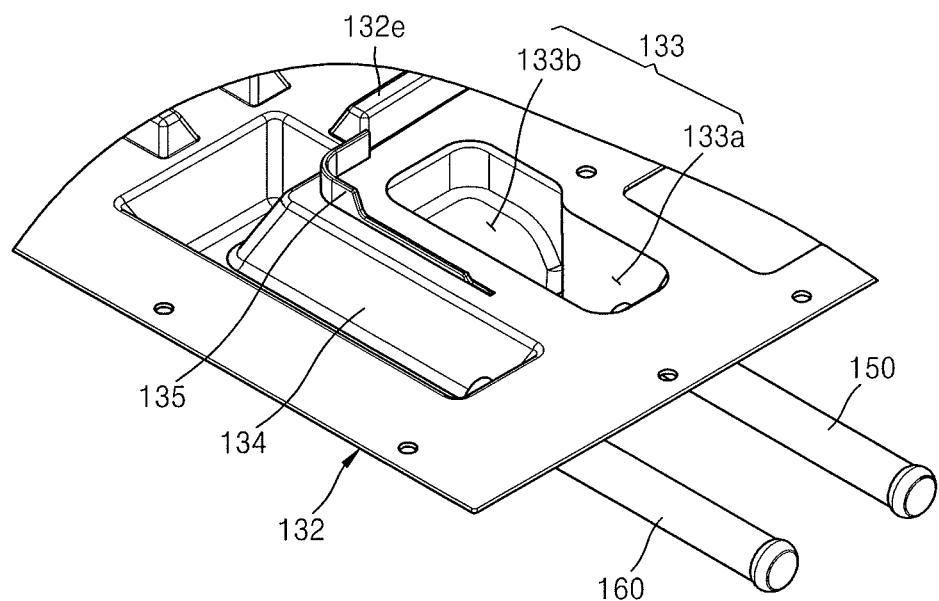
FIG. 5 illustrates a perspective view of a container, a second guide projection, a buffer and a separating plate in FIG. 2.
Figure 6:
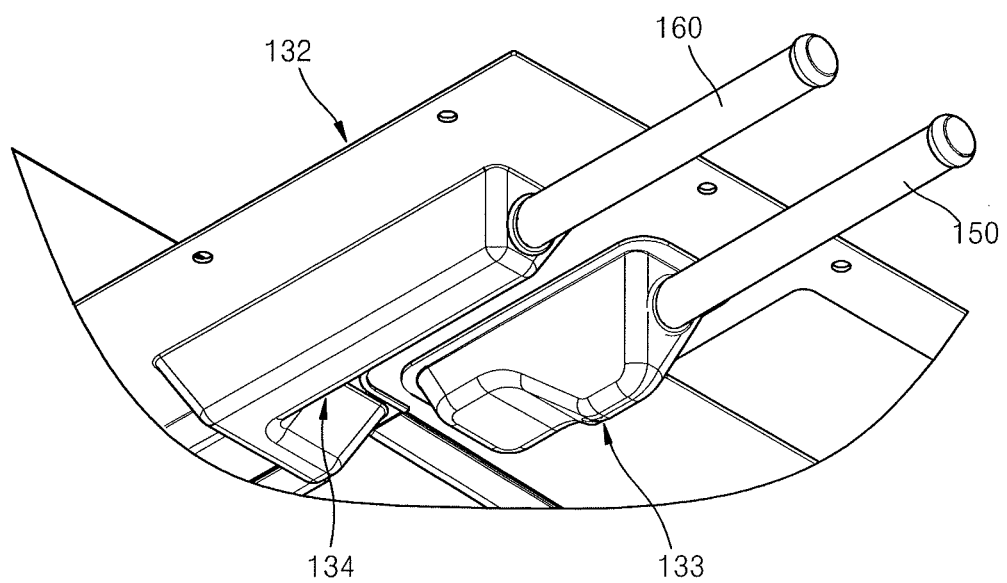
FIG. 6 illustrates a perspective view of a container and a buffer in FIG. 2.

FIG. 1 illustrates an exploded perspective view of a battery pack 100 according to an exemplary embodiment. FIG. 2 illustrates an exploded perspective view of a cooling plate shown in FIG. 1. FIG. 3 illustrates a perspective view of a back side of a first cooling plate shown in FIG. 2. FIG. 4 illustrates a perspective view of a container shown in FIG. 2. FIG. 5 illustrates a structures of and relationships between a container, a second guide projection, a buffer and a separating plate in FIG. 2. FIG. 6 illustrates a perspective view of a container and a buffer in FIG. 2.

Referring to FIGS. 1 to 6, the battery pack 100 may include a housing 110, a battery module 120, a cooling plate 130, a contact member 140, an inlet pipe 150, and an outlet pipe 160.

The housing 110 may include a body 111, a cover 112, and partitions 113. The body 111 may have an inner space and openings at sides, e.g., both sides, thereof. The battery module 120 may be arranged in the inner space of the body 111.

The cover 112 may be coupled over one of the openings of the body 111. For example, the cover 112 may be coupled with the body 111 at one side of the body 111. Protrusions and depressions may be formed on a surface of the cover 112. The cover 112 may contact external air and may discharge heat from inside of the battery pack 100 to the outside.

The partitions 113 may be spaced apart from each other in the body 111. The partitions 113 may be fixed to or coupled with the cooling plate 130. In an implementation, the partitions 113 may group a plurality of battery modules 120. The partitions 113 may help prevent groups of battery modules 120 from colliding with one another, e.g., may space the groups of battery modules 120 apart from one another.

The battery module 120 may be inserted and/or accommodated in the body 111. The battery module 120 may be formed as or include a secondary battery. For example, the battery module 120 may include a can, an electrode assembly that is inserted in the can, and a cap plate that is coupled to the can and seals the can. In an implementation, the battery module 120 may include a pouch and an electrode assembly that is arranged in the pouch. In an implementation, the battery module 120 may have a suitable form or structure of a secondary battery.

The cooling plate 130 may include a first cooling plate 131, a second cooling plate 132, a container 133, and a buffer 134.

A first surface S1 of the first cooling plate 131 may be uneven. For example, the first surface S1 of the first cooling plate 131 may not be flat. In an implementation, grooves may be formed on a surface different from the first surface S1 of the cooling plate 131, e.g., a second surface S2. For example, the first surface S1 of the first cooling plate 131, which may contact a side of the battery module 120, may have a protruding portion 131a. The battery module 120 may be arranged on the protruding portion 131a of the first cooling plate 131. For example, the plurality of battery modules 120 may be arranged adjacent to one another along a lengthwise direction of the protruding portion 131a of the first cooling plate 131.

A plurality of grooves may be formed in the second surface S2 of the first cooling plate 131. For example, a first groove 131b may be formed in all areas of the second surface S2 of the first cooling plate 131. In an implementation, a second groove 131c may be formed in a portion of the second surface S2 of the first cooling plate 131. The second groove 131c may be formed corresponding to or aligned with the protruding portion 131a of the first cooling plate 131.

The first and second grooves 131b and 131c and the second cooling plate 132 may form a flow path P. In an implementation, the flow path P may form a certain angle with an arrangement direction of the battery module 120. In an implementation, the flow path P may be inclined at an angle with, may form a right angle with, or may be parallel to the arrangement direction of the battery module 120. Hereinafter, for convenience of description, an example in which the flow path P forms a right angle with the arrangement direction of the battery module 120 will be mainly described.

The second cooling plate 132 may be coupled with the first cooling plate 131 and may form a part of the flow path P. The second cooling plate 132 may include a projection 132a that protrudes toward the first cooling plate 131.

The projection 132a may include a first projection 132b and a second projection 132c that are adjacent to one another. The first and second projections 132b and 132c may be spaced apart from one another and may form a part of the flow path P. In an implementation, the first and second projections 132b and 132c may be alternately arranged and may form the flow path P.

The first and second projections 132b and 132c may be formed in the same or similar manner, and hereinafter, for convenience of description, the first projection 132b will be mainly described in detail.

The first projection 132b may be uneven. For example, each first projection 132b may include a first sub-projection 132b-1 (that is inserted into the second groove 131c when the battery pack is assembled) and a second sub-projection 132b-2 (that contacts a lower portion of the first groove 131b when the battery pack is assembled). The first and second sub-projections 132b-1 and 132b-2 may be connected to each other. In an implementation, the first and second sub-projections 132b-1 and 132b-2 may be connected to each other and/or continuously extend in a direction that is perpendicular to a lengthwise direction of the second groove 131c. For example, the first and second sub-projections 132b-1 and 132b-2 may be alternately arranged and connected to each other in a direction that is perpendicular to the lengthwise direction of the second groove 131c.

The first and second sub-projections 132b-1 and 132b-2 may have different heights. For example, a height of the first sub-projection 132b-1 may be greater than a height of the second sub-projection 132b-2.

The first and second sub-projections 132b-1 and 132b-2 may be formed of a plurality of first sub-projections and a plurality of second sub-projections, respectively. The plurality of first sub-projections 132b-1 may be separated from each other, and the plurality of second sub-projections 132b-2 may also be separated from each other. For example, the plurality of first sub-projections 132b-1 may be separated from one another in one selected from the lengthwise direction of the second groove 131c and a direction perpendicular to the lengthwise direction of the second groove 131c. In an implementation, the plurality of second sub-projections 132b-2 may be separated from one another in one selected from the lengthwise direction of the second groove 131c and a direction perpendicular to the lengthwise direction of the second groove 131c.

Along with the first and second projections 132b and 132c, the projection 132a may include a first guide projection 132d that is connected to, adjacent to, or in communication with at least one selected from the plurality of first projections 132b and the plurality of second projections 132c and may help guide a coolant (e.g., in the flow path P).

In an implementation, the first guide projection 132d may be substantially perpendicular to the first and second projections 132b and 132c and may help guide the coolant. The first guide projection 132d may include a plurality of first guide projections. For example, the first guide projection 132d may include a first sub-guide projection 132d-1, a second sub-guide projection 132d-2, and a third sub-guide projection 132d-3.

The first to third sub-guide projections 132d-1 to 132d-3 may be separated or spaced apart from each other. The first to third sub-guide projections 132d-1 to 132d-3 may be in parallel to each other without overlapping one another. The first to third sub-guide projections 132*d*-1 to 132*d*-3 may be separated from each other in a flowing direction of the coolant.

In an implementation, respective distances between the first to third sub-guide projections 132*d*-1 to 132*d*-3 and the first and second projections 132*b* and 132*c* of the projection 132*a* (which may be substantially perpendicular to the first to third sub-guide projections 132*d*-1 to 132*d*-3) may vary. For example, a first distance L1 from the first sub-guide projection 132*d*-1 to an end of the first and second projections 132*b* and 132*c* of the projection 132*a* (which may be substantially perpendicular to the first sub-guide projection 132*d*-1), a second distance L2 from the second sub-guide projection 132*d*-2 to an end of the first and second projections 132*b* and 132*c* of the projection 132*a* (which may be substantially perpendicular to the second sub-guide projection 132*d*-2), and a third distance L3 from the third sub-guide projection 132*d*-3 to an end of the first and second projections 132*b* and 132*c* of the projection 132*a* (which may be substantially perpendicular to the third sub-guide projection 132*d*-3) may sequentially increase in this stated order.

In an implementation, the projection 132*a* may further include a second guide projection 132*e* that helps guide coolant that is to be emitted or discharged to the outside. The second guide projection 132*e* may be formed on the second cooling plate 132 such that the second guide projection 132*e* protrudes toward the first cooling plate 131. A portion of the second guide projection 132*e* may be bent to help guide the coolant passing through the flow path P toward the buffer 134. In an implementation, the second guide projection 132*e* may help guide the coolant from an area of the second cooling plate 132 to the buffer 134. The second guide projection 132*e* may help guide the coolant passing through the flow path P, which may be formed in an area that is approximately half the size of the second cooling plate 132, toward the buffer 134.

The cooling plate 130 may include a separating plate 135 on the second cooling plate 132. The separating plate 135 may be provided between the buffer 134 and the container 133. The separating plate 135 may be connected to the second guide projection 132*e* and may help prevent coolant that is, e.g., newly, supplied from the outside from being mixed with the coolant already circulating through the flow path P.

The container 133 may be provided on the second cooling plate 132. The container 133 may have an inner space. For example, the inner space of the container 133 may include a first space 133*a* and a second space 133*b*. The first space 133*a* and the second space 133*b* may have a stair-step structure. For example, a bottom of the first space 133*a* may be lower than a bottom of the second space 133*b*.

In an implementation, a volume of the first space 133*a* may be different from a volume of the second space 133*b*. For example, the volume of the first space 133*a* may be greater than the volume of the second space 133*b*.

The buffer 134 may be provided on the second cooling plate 132 and may temporarily store the coolant that is to be emitted or discharged to the outside. In an implementation, the buffer 134 may be integrally formed with the second cooling plate 132 or may formed as a separate unit and coupled to the second cooling plate 132.

The inlet pipe 150 may be connected to the outside and may supply the coolant from the outside to the container 133. The outlet pipe 160 may be connected to the buffer 134 and may emit or discharge the coolant in or from the buffer 134 to the outside.

The contact member 140 may be provided between the cooling plate 130 and the battery module 120. The contact member 140 may not only make the battery module 120 contact the cooling plate 130, but may also transmit heat of the battery module 120 to the cooling plate 130.

With regard to operations of the battery pack 100, when the battery module 120 is used, heat may be generated by the battery module 120. The heat may affect performance, durability, and stability of the battery module 120, and it may be desirable that the heat be reduced or dissipated such that the battery module 120 maintains an appropriate temperature.

For example, the coolant may be supplied from the outside to the container 133 via the inlet pipe 150. The coolant in the container 133 may sequentially fill the first space 133*a* and then the second space 133*b*, and may then be supplied to the flow path P.

In this case, the coolant may be supplied to the flow path P after completely filling the container 133. If the container 133 were not included, the inlet pipe 150 could be directly connected to the flow path P to supply the coolant. However, the coolant that is supplied from the outside to the flow path P could have an uneven pressure level. Thus, the coolant could cause vibrations in the cooling plate 130. According to the present exemplary embodiments, the coolant may be supplied from the container 133 to the flow path P after the coolant is completely supplied to the container 133. Thus, the coolant may be supplied to the flow path P with a uniform pressure level.

The coolant that is supplied to the container 133 as described above may be supplied to an area between the first and second cooling plates 131 and 132 via the container 133. For example, the coolant may be emitted from the inlet pipe 150 to an area between the first and second cooling plates 131 and 132 at a certain angle. For example, the coolant from the inlet pipe 150 may completely fill the container 133 and be supplied at a right angle relative to a flow of coolant coming from the inlet pipe 150. Accordingly, a proceeding direction of the coolant that flows into the inlet pipe 150 may be changed. For example, the container may redirect the coolant flowing in from the inlet pipe 150 at varying pressures and amounts to provide the coolant at a uniform pressure, uniform amount, and the like. Thus the coolant may be smoothly and uniformly guided to an area between the first and second cooling plates 131 and 132. Therefore, drawbacks that could otherwise occur when directly supplying the coolant between the first and second cooling plates 131 and 132, e.g. the coolant being accumulated in a certain area or air bubbles being created in the coolant, may be avoided.

The coolant that is supplied to the first and second cooling plates 131 and 132 may be supplied to the first groove 131*b* and then distributed to the flow path P formed in or on the first groove 131*b* and the second groove 131*c*. The first to third sub-guide projections 132*d*-1 to 132*d*-3 may uniformly distribute the coolant that is first supplied to the first groove 131*b*.

The coolant that is supplied as described above may move through the flow path P that is formed between the first and second projections 132*b* and 132*c*. The coolant may move in a direction that is perpendicular to a direction in which the plurality of battery modules 120 is arranged. For example, as the coolant moves through the flow path P and is supplied to the second groove 131*c*, the coolant may absorb the heat generated by the battery module 120.

The coolant that moves as described above may move to a portion of the second cooling plate 132 where the first and second guide projections 132d and 132e are formed and another portion of the second cooling plate 132 which is opposite to the portion of the second cooling plate 132, pass through the flow path P again, and may then move to the buffer 134. The second guide projection 132e may guide the coolant passing through the flow path P to the buffer 134.

The coolant that is guided to the buffer 134 may fill the buffer 134 and may then be emitted or discharged to the outside via the outlet pipe 160.

An inner temperature of the above-described battery pack 100 may be maintained constant. For example, the coolant may be uniformly supplied into the cooling plate 130. For example, if the container 133 were to be omitted, the coolant could be directly supplied from the inlet pipe 150 to the first groove 131b. In this case, according to an angle at which the inlet pipe 150 is mounted, the coolant could undesirably accumulate in a certain area. The coolant could also be unevenly supplied to the flow paths P, and a flowing speed and a supply amount of the coolant could undesirably vary. Accordingly, only a certain inner portion of the battery pack 100 could be cooled, and portions other than the cooled certain portion of the battery pack 100, could not be effectively cooled.

In an implementation, when the container 133 is included as described above, the coolant supplied from the inlet pipe 150 to the container 133 may first fill the container 133 and may then be supplied to the first groove 131b. Thus, the coolant may be supplied to the first groove 131b at an uniform pressure. Also, the coolant may be supplied to the container 133 via a bent or indirect flow path, and it is possible to reduce and/or prevent accumulation of the coolant in a certain area when the coolant is directly supplied from the inlet pipe 150, and to reduce and/or prevent an uneven supply amount of the coolant.

Therefore, the battery pack 100 may uniformly supply the coolant, and it is possible to quickly reduce and maintain constant a temperature inside the battery pack 100. For example, a difference between temperatures at different parts of the battery pack 100 may be adjusted to be lower than a certain level.

In an implementation, the cooling plate 130 in the battery pack 100 may be large so that the battery pack 100 is strong.

In an implementation, the battery pack 100 may not include a separate cooling path between the battery modules 120 to cool the battery modules 120, and it may be less likely for the battery pack 100 to have faults due to water leaks or malfunction.

By way of summation and review, heat may be generated by the battery module when the battery module operates. The heat may affect the chemical reaction that occurs in the battery module, and may decrease inner stability of the battery module. Effective heat reduction may be a factor in determining the performance and durability of the battery module.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery pack, comprising:
a housing;
at least one battery module arranged in the housing; and
a cooling plate coupled to the housing and cooling the at least one battery module,
wherein the cooling plate includes:
a first cooling plate that contacts the at least one battery module;
a second cooling plate coupled to the first cooling plate, the second cooling plate including a flow path therein; and
a container on the second cooling plate, the container having an inner space that is connected to the flow path, and
wherein, when the cooling plate is operated, a coolant enters the container in a first direction and exits the container in a second direction, the second direction being orthogonal to the first direction,
wherein the inner space of the container has a stair-step structure such that a volume of a flat-bottomed region of the inner space of the container into which the coolant flows from an inlet is larger than a volume of a flat-bottomed region of the inner space of the container out of which the coolant exits the container, the flat bottoms of the flat-bottomed regions of the inner space being parallel with one another, and the second direction being orthogonal to flat-bottomed surfaces of the flat-bottomed regions of the inner space.

2. The battery pack as claimed in claim 1, wherein a surface of the first cooling plate is uneven.

3. The battery pack as claimed in claim 2, wherein the at least one battery module is mounted on a protruding portion of the first cooling plate.

4. The battery pack as claimed in claim 1, wherein the second cooling plate includes a projection that protrudes toward the first cooling plate.

5. The battery pack as claimed in claim 4, wherein the projection is uneven.

6. The battery pack as claimed in claim 1, wherein:
the at least one battery module includes a plurality of battery modules, and
a direction of the flow path and a direction in which the plurality of battery modules is arranged to form an angle or are parallel to each other.

7. The battery pack as claimed in claim 1, wherein the cooling plate further includes a buffer that is connected to the flow path of the second cooling plate, the buffer having a space to temporarily store the coolant.

8. The battery pack as claimed in claim 1, wherein the cooling plate includes a guide plate that directs the coolant toward the flow path in a third direction, the third direction being orthogonal to the first direction and to the second direction.

* * * * *